United States Patent Office 2,845,357
Patented July 29, 1958

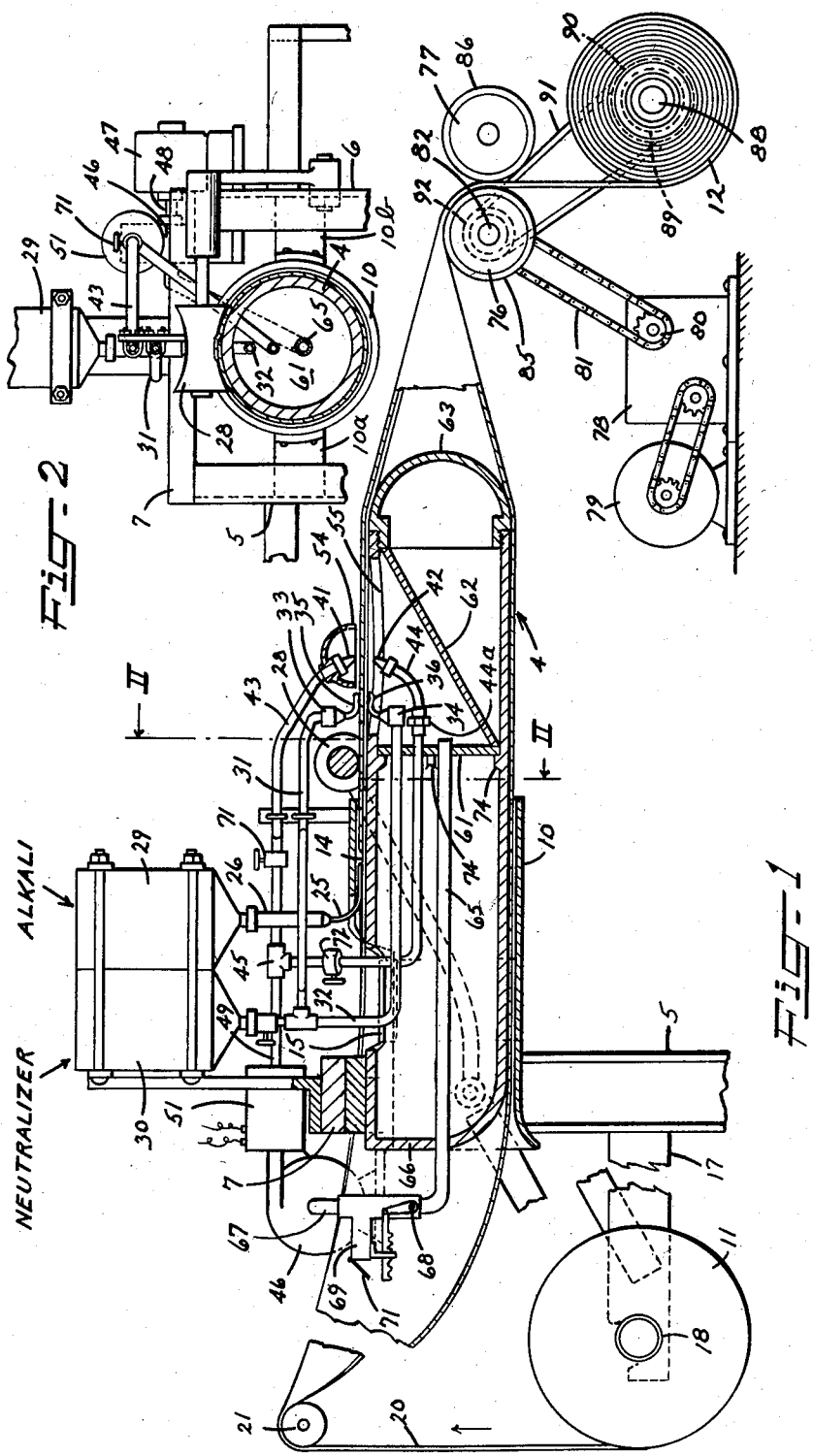

2,845,357

MANUFACTURING OF FLEXIBLE SHEETS INTO CASINGS

David T. Milne, Fredericksburg, Va., assignor to American Viscose Corporation, Philadelphia, Pa., a corporation of Delaware Application October 6, 1954, Serial No. 460,571

4 Claims. (Cl. 99—176)

The present invention relates to the forming of seals or joints in sheet materials, and particularly to a joint comprising a material such as an alkali-soluble, water-insoluble substance, e. g. certain cellulose ethers which may be rendered tacky by the application of an alkaline solution to sheet surfaces previously to the uniting thereof.

When film, pellicles, casings, bands or other articles comprising a thin-walled material containing an alkali-soluble ingredient are joined by the uniting of alkali-treated surfaces, it is generally desirable to neutralize the alkali after such sealing so as to strengthen the joint, to eliminate tackiness, and prevent contamination of other goods that may be brought into contact with the exterior areas of the joints. Furthermore, if, for example, casings having such joints are stored in the flattened condition, the alkali will leach into adjacent portions of the casings or adjacent casings brought into contact with the joined portions to cause undesirable cohesion. Neutralization of the alkali contained within the alkali-soluble substance surrounding the joined surfaces may be readily accomplished by the application of an acid, preferably a weak one, such as dilute acetic acid or vinegar. However, unless the casings are to be used immediately, any acid left must be flushed from the surface of the casings or it will eventually, for example, during an extended storage period, embrittle and weaken the thin-walled alkali-soluble material.

The use of an acid for neutralization is satisfactory, for example, in a process for continuously manufacturing stuffed meat products, such as sausages or weiners, wherein a sheet is formed into a tube and practically simultaneously sealed and stuffed. The stuffed tubular package may thereafter be subjected to spraying with water and a linking operation to form the individual sausages or weiners. The cooking operation which follows completely dissipates any residual acid remaining after neutralization within the atmosphere or the meat product. Furthermore, as most of the meat products produced in this manner are stripped of the thin walled covering of cellulose ether material, the difficulty that excess acid might cause embrittlement with aging does not arise. However, a large number of food and meat products are sold with their cellulosic covering sealed thereabout. In the manufacturing of a great proportion of these products, it is desirable to have supplied to the manufacturer thereof casings which may be stored for a considerable period before use, and are completely prefabricated and imprinted with any advertising or identifying matter that the manufacturer wishes the casings to carry.

Empty casings of the sealess tube-type, as heretofore provided to the trade, have the disadvantage that, on account of certain limitations of the manufacturing process, they cannot be printed in a continuous circumferential direction, that is to say, printing thereof is restricted to certain longitudinal panels of the casing. Most satisfactory printing is obtained by printing a flat sheet which is later formed into a tube with a longtiudinal joint. Moreover, the production of casings from an alkali-sealable sheet material comprising an alkali-soluble ingredient is subject to the disadvantages hereinabove set forth with respect to the use of an acid neutralizer.

It is an object of the present invention to provide a more simplified and less expensive process than available for manufacturing, as articles of commerce, empty casings formed of sheet materials comprising an alkali-soluble ingredient.

It is another object to provide a process for manufacturing casings formed from sheet materials carrying printed matter, such materials comprising an alkali-soluble ingredient and being readily formed into fully prefabricated casings carrying such identification or advertising matter as desired printed thereon, such casings being adapted as articles of commerce for unlimited distribution and indefinite storage periods.

A specific object is to neutralize excess alkali used in rendering the alkali-soluble material referred to in the foregoing objects tacky along the portions thereof to be joined without the application or production of an acid substance within or upon a joint of the material, or without the necessity for washing or otherwise removing an acidic substance.

A further object ancillary to the last-named object is to use neutralizing media for excess alkali that may be used in excess of that required for neutralization without causing deterioration of the alkali-soluble material during prolonged storage periods, such media being free from the production of obnoxious decomposition productions during such periods and being compatible and non-contaminating with respect to goods to be packaged within a casing or wrapper comprising the alkali-soluble material.

It is also an important object of this invention to provide apparatus in which a process having the desirable features outlined in the foregoing objects may be satisfactorily practiced.

Other objects, features and advantages will become more apparent from the following description of the invention and the drawing relating thereto in which:

Fig. 1 is a shortened longitudinal elevation partly in section illustrating essential elements of the apparatus of the invention; and Fig. 2 is a transverse sectional elevation taken along line II—II of Fig. 1.

For accomplishment of the above objects, a process and an apparatus are provided for shaping a sheet of alkali-soluble, water-insoluble material of indefinite length into a tubular casing. In forming the sheet into a casing, edge portions of the sheet are first treated with an alkali solution, then brought into overlapping relationship, and placed together to form a joint. The alkaline material contained in the joint is then neutralized by application to the joint, preferably both outside and inside the casing of a solution of a non-acid material which reacts with the alkali to produce at least one volatilizable reaction product and, in the usual instance, a substantially neutral non-volatilizable product. The step of applying the alkali is controlled so as to render tacky merely those opposing surfaces to be joined and, preferably narrow additional areas extending in contiguous longitudinal relation with the opposing surfaces to insure the joints free from unadhered portions of the overlapping material. The neutralizer is applied over the entire joint to one or both sides of the product comprising the joint to react with any alkali held by the alkali-soluble sheet material within or adjacent the joint. The neutralizer used is preferably one which reacts with the alkali to produce a compound that functions as a plasticizer or softener for the material of the sheet. Such a compound may function also as a preservative for foods or other materials to be packaged in the casing.

Although the apparatus of the present invention may be readily adapted to the manufacturing of stuffed meat products, it is a primary objective to use this apparatus and the method practiced in its operation to manufacture packaged casings in condition for immediate shipment which may be stored for an indefinite period without deterioration. The casings are therefore completely dry and free of any material, such as used in the sealing thereof, which might adversely affect the material constituting the original sheet. For example, it is essential, in the event that the casings will be stored for a considerable period, that they be completely free of excess alkali employed as a tackifying material, or an acid, or other material which would tend to embrittle a sheet material comprising a cellulose ether. In the usual practice of this invention, a chemically neutral product of the reaction between the alkali tackifying medium and the neutralizing substance will remain in the material of the casing comprising the joint. The preferred neutralizing materials employed in this invention behave as plasticizers for a film-forming cellulose ether compound and assure that the casing will be free from embrittlement. In all cases herein disclosed, an excess of the neutralizing medium is not objectionable within the material of the casing comprising the joint since it is substantially chemically inert with respect to the material of the casing.

The seamed or jointed artificial casing produced in accordance with this invention preferably comprises an alkali-soluble, water-insoluble cellulosic material such as a lower alkyl, hydroxyalkyl, or carboxy-alkyl ether of cellulose; preferred specific materials being methyl, ethyl, hydroxyethyl, and carboxymethyl ethers of cellulose, mixed cellulose ethers in this class, and also sheets derived from cellulose ether-xanthates, cellulose xantho-ethers, cellulose thiourethanes, and cellulose xantho-fatty acids. A preferred combination of sheets suitable for fabricating the casings produced in accordance with this invention comprises a thin porous paper thoroughly impregnated with an alkali-soluble, water-insoluble cellulose ether, such as hydroxyethyl cellulose. Such a material is rendered immediately tacky by the moistening of its surface by a dilute alkaline solution containing from 1 to 10 percent of alkali.

The adhesive used in sealing the overlapping edges of the sheet in forming the casing may be any alkaline liquid such as a dilute solution of sodium or potassium hydroxide. If desired, the adhesive may be an alkaline solution of one of the alkali-soluble cellulosic materials of which the casing may be made and the cellulosic material in the adhesive may be the same as, or different from that of the sheet. The adhesive may be applied to one edge of the sheet before it is formed into a tube or it may be inserted between the edges of the sheet as they are overlapped in forming the casing. If desired, a coating of the alkaline adhesive material may be applied adjacent one edge of the sheet and dried before the sheet is wound up into a roll, or before it is passed into the casing-forming machine. In this latter case, it is merely necessary to wet the coated edge of the sheet as it proceeds to the casing-forming position before or after the edges are overlapped. In a preferred form of the invention, the amount of adhesive applied is controlled by feeding it through a wick or with a roll or wheel which is held in contact with the surfaces of the sheet to be joined.

After the edges have been overlapped with the adhesive or tackifying agent supplied therebetween, they are preferably subjected to pressure as they proceed along the forming member around which the sheet is urged to assure good adhesion. Pressure is advantageous in a further respect in that excess alkaline liquid applied to the overlapping edges is expressed from therebetween to render it readily accessible to the neutralizing liquid applied to the seam as the now-formed casing advances under a neutralizer applicator. Preferably, the neutralizing solution is applied to the exterior surface as well as the interior surface of the casing. It is desirable that the neutralizer be applied at least to the exterior surface since it is difficult to remove moisture or other liquid which may encourage a tacky condition interiorly of the casing. To assure that all moisture is removed which might be introduced by the alkaline tackifying agent and the neutralizer, air or other gas, preferably heated, is directed against the exterior and interior surface of the joint or it may be wiped and/or subjected to suction.

The neutralizing material to be used in the present invention is a substantially neutral substance which is readily soluble in water and which reacts with an alkali for formation of a substantially neutral substance and a volatile substance. In a preferred class of such neutralizers, the cationic portion will on hydrolysis, form a substance which decomposes or dissociates into components with the formation of at least one volatile substance. This is true of the ammonium salts disclosed. The neutralizers are chosen so that the neutralizers themselves or the reaction products remaining in the material of the casing are non-poisonous, especially when used in the packaging of foods. Some of the neutralizing materials and the reaction products thereof are plasticizers which maintain the material of the casing in a softened condition. Some of the neutralizers and the reaction products thereof are actually preservatives for food although their presence in the products of the present invention does not occur to such an extent as to supplant the use of compounds incorporated into food as preservatives.

Examples of neutralizers which occur ordinarily as salts, but are readily soluble in water to become a substantially neutral neutralizing medium for alkali are ammonium salts of organic acids, such as ammonium acetate, ammonium lactate, ammonium benzoate, ammonium salicylate, ammonium succinate, ammonium propionate, and ammonium tartrate. An example of a non-acidic ammonium salt of an inorganic acid that is satisfactory in aqueous solution as a neutralizer is ammonium phosphate. Ammonium benzoate and ammonium salicylate as used in this invention yield the reaction products sodium benzoate and sodium salicylate, respectively, which are well-known food preservatives. The examples just listed are meant to include any degree of ammoniation to which the valence of the anionic portions of these compounds permit. For example, the term "ammonium tartrate" would include the "mono" or "di," ammonium species of the compound. As examples of other than ammonium salts, that may be dissolved in water to make substantially neutral solutions, i. e. not strongly acid nor alkaline, are sodium monochloroacetate and ethylene chlorohydrin. The latter may be used where there is no need to maintain the casing completely free of toxic materials.

If the joints in the casings tend to be brittle, plasticizer or softener may be added to the solution of the neutralizing compound. In using ammonium acetate, an excess remaining in the joint over that needed to neutralize the alkali will act as a softener or plasticizer since the ammonium acetate is hygroscopic. However, ammonium tartrate does not behave in the same manner and tends to produce a somewhat harder seam. Thus, it may be desirable in using the latter compound, to include as a plasticizer in the neutralizing solution, some substance such as glycerine, glycol, or sorbitol.

Other characteristics of the solution of neutralizer, such as a tendency thereof to wrinkle the material of the casing, or the rapidity with which the neutralizing solution penetrates the material of the casing, may be influenced favorably. Wrinkling may occur as the result of uneven drying, or the material to be sealed may be sensitive to water. In either case, a volatile water-miscible solvent such as alcohol, acetone, or isopropyl alcohol may be added to the neutralizing solution. An example of a composition useful for treating a water-sensitive alkali-soluble material of the type herein referred to comprises 5% ammonium acetate, 5% water, 10% glycerol, and 80% ethanol. When the material to be sealed resists wetting or penetration by the neutralizer, a wetting agent may be incorporated such as sodium 3,9 diethyl tridecanol-6 sulfate, or alkyl aryl sulfopropionic esters.

As examples illustrating the use of substantially neutral substances which may be used to neutralize alkaline treated joints of alkali-soluble sheet materials, the following are submitted:

*Example I*

The edges of a length of fiber-containing hydroxyethyl cellulose sheet were overlapped and sealed with 8% aqueous sodium hydroxide to form a joint which shapes the sheet into a tube. The joint was treated with 20% aqueous ammonium acetate containing 0.2% of a 38% solution of sodium-2-ethyl hexanol-1 sulfate as a wetting agent. The seal was thereafter heated to dry it. The pH of the joint was thereafter determined by cutting one portion thereof into squares of one square centimeter and macerating the cut up portion with 20 ml. of distilled water. Fifty addition ml. of distilled water were added and after the solution stood about an hour, the pH was determined. As a further check on the pH, the mixture of water and paper prepared as above was refluxed for one hour in a soil-digesting flask, the temperature of the water being maintained at 95 to 100 degrees centigrade. The pH was measured again at a temperature between 20 and 30 degrees centigrade. The pH determined from the joint produced in accordance with this example was 7. The same method of pH determination is used in all of the following examples.

*Example II*

A joint of sheet material was prepared in the manner as described in Example I except that instead of heating the joint, it was allowed to stand overnight. The aqueous extract prepared from the seal, as described in Example I, had a pH of 7.

*Example III*

The edges of a length of fiber containing hydroxyethyl cellulose sheet were overlapped and sealed with an aqueous composition containing 2% sodium hydroxide to form a tube. To the outside of the joint thus prepared was applied 6.6% aqueous di-ammonium phosphate to dampen the overlapping edge portions of the sheet. After standing a few hours, the seal was examined for pH as described in Example I and was found to have a pH of 7. In a wet condition, this casing burst at an inflation pressure of 6 pounds, 15 ounces.

*Example IV*

The procedure of Example III was repeated except that a 9.2 solution of di-ammonium tartrate was substituted for the aqueous di-ammonium phosphate solution and was applied to both the inside and outside of the tube along the overlapping portions. After drying the joint, the pH of the joint was determined in accordance with the procedure recited in Example I and found to be 7.2. A wet portion of this tube was tested for maximum inflation pressure and burst at a pressure of 6 pounds, 7 ounces.

*Example V*

The procedure of Example IV was followed except that an 8.1% aqueous solution of tri-ammonium citrate was substituted for the aqueous solution of di-ammonium phosphate. After the joint was dried, it was found to have a pH of 6.5.

*Example VI*

The procedure of Example III was followed except that a 9.2% aqueous solution of di-ammonium tartrate was substituted for the di-ammonium phosphate solution and applied merely to the outside of the seal. The zone of overlap was warmed by bringing a heated metallic surface close to the joint. Thereafter, the joint was determined to have a pH of 8.2.

*Example VII*

The procedure of Example IV was repeated except that a 20% aqueous solution of ammonium acetate was substituted for the di-ammonium tartrate and the sealed portion of the tube was warmed and dried by bringing a heated metallic surface close to it. The pH of the joint was found to be 6.2.

*Example VIII*

The procedure of Example III was repeated except that after making the joint, the pH thereof was determined without further treatment, i. e., that alkali of the joint was not neutralized. The pH of the untreated seal was 10.4. This seal was considered too alkaline to be suitable for prolonged storage.

Sealed casings may be produced in accordance with the method hereinbefore described by apparatus such as illustrated in the drawing. In Fig. 1 is shown an assembly comprising a generally cylindrical mandrel or forming member 4 supported by a pair of posts 5 and 6 which are connected to the mandrel by transverse cross member 7 and a tie block 8. The block 8 spaces the mandrel from the cross member so that the edges of the sheet 20 may advance freely without engaging the undersurface of the cross member. A partly cylindrical sleeve-like guide member 10 surrounds a substantial portion of the mandrel which is rearwardly with respect to the direction of movement of the sheet from the portion of the mandrel which the sleeve 10 does not cover. The sleeve 10 extends in spaced circumjacent generally concentric relation with the periphery of the mandrel and is supported from the posts 5 and 6 by brackets 10a and 10b. In the longitudinally forward portion of the sleeve within which the edges of the sheet are brought into overlapping relationship at approximately the point indicated by numeral 14, the sleeve 10 is circumferentially continuous. To the rear of this portion, the sleeve is cut-away through a substantial arc of its circumference to expose the rearward opening 15 of the mandrel for extension therethrough of supply lines hereinafter described, and for access to parts of the mandrel. The supply roll 11 is readily detachable or replaceable with respect to a pair of cantilever supports, such as support 17, which are attached to posts 5 and 6. The supports are spaced and notched to receive end portions of the central tube 18 protruding beyond the ends of the supply roll 11.

The roll 11 comprises a sheet 20 which passes over a guide roll 21 into the arcuate space between the sleeve 10 and the mandrel 4. The guide roll 11 is spaced horizontally from the mandrel in approximately horizontal alignment with an upper longitudinal surface portion of the mandrel to enable feeding of the sheet 20 without wrinkling. The spacing of the guide roll from the mandrel will depend on the width of the sheet. The sheet is shaped to a circular cross section as it proceeds between the mandrel and the sleeve until its edges are brought into overlapping relation at approximately station 14. A wick 25 protruding from a duct 26 extends into the space between the mandrel and the guide and between the overlapping edges of the sheet. The wick 25 moistens opposed mutually-facing marginal surfaces of the sheet which are pressed firmly together by a pressure roll 28. The tank or reservoir 29 to which the duct 26 is connected supplies a liquid to the wick 25 which renders the surfaces of the sheet 20 tacky. In the manufacturing of casings from the material for which this apparatus has been primarily devised, i. e., a sheet material comprising an alkali-soluble ether, the tackifying medium contained by the tank 29 is an alkaline solution. While the wick 25 applies the tackifying medium in small quantities, such as to merely moisten the surfaces of the sheet which it engages, the roll 28 not only presses the tacky surfaces together but expresses excess liquid from between the joined surfaces.

A liquid neutralizing material is stored in the tank 30 which is connected by tubes 31 and 32 with wick-supporting nozzles 33 and 34 from which wicks 35 and 36, respectively, extend into the path followed by the joint of the casing comprising the overlapping edges of the sheet 20 when advancing away from the roll 28. The wicks 35 and 36 are preferably of sufficient width to cover the upper and lower surfaces of the joint and particularly surfaces of the casing at both sides of the extreme edge of each of the overlapping portions. It is desired that the wicks cover these edges because of the possibility that excess alkaline solution may have been expressed in the joint by the roll 28. Accordingly, the width of the wicks 35 and 36 is normally greater than the thickness, and they are generally ribbon-shaped.

As the casing produced by the apparatus herein described is to be packaged immediately and preferably by the apparatus itself, moisture applied to the casing material contained in the tackifying medium and the neutralizing solution which may be absorbed in the material constituting the joint or seal of the casing is preferably dispelled. This may be accomplished by an air blast or other heating instrumentality. In the present invention, the drying of the joint is accomplished with efficiency by heated air blasts applied to both sides of the joint. Accordingly, heated air is directed against the casing surfaces from the nozzles 41 and 42 supported by supply tubes 43 and 44 therefor. The nozzle 41 is supported in superjacent relation with the path traversed by the joint of overlapping sheet portions advancing from the roll 28; the nozzle 42 is supported in subjacent relation with such path. The supply tubes extend rearwardly with respect to the length of the mandrel from respective nozzles to a manifold 45 connected with a centrifugal pump 46. The pump is connected in drive relation with a motor 47 by a shaft 48 as shown. An air conducting assembly comprising the duct 49 and an electrical heater 51 of conventional construction connects the manifold 45 and the pump 46. To render the heating and drying of the casing joint as accomplished by the nozzle 41 more effective, a shield 54 mounted on the tube 43 encloses a region disposed immediately over the casing which surrounds the nozzle 41. The heated air discharged by the nozzle may escape to the atmosphere as occurs in the arrangement shown.

The mandrel 4 has an opening in which the nozzle 42, the wick holder 34, and the wick 36 are positioned. This opening is defined by a peripheral surface 55. As shown, the nozzles 41 and 42 are spaced in the direction of movement of the casing further away from the pressing roll 28 than the applicators of the neutralizer solution, i. e. the wicks 35 and 36.

Since it is neither necessary nor desirable to heat the apparatus but to heat merely that portion of the casing which passes between the neutralizer wicks after the application of the neutralizer to the casing, it is advantageous to conduct the heated air introduced interiorly of the mandrel from the mandrel with a minimum of heating the wall thereof. The region within the mandrel adjacent to or surrounding the opening defined by the surface 55 is enclosed by baffles 61 and 62 and portions of the circular wall of the mandrel extending above the baffle 62, and between the baffle 61 and an end closure 63 for the mandrel. In the region thus enclosed are housed the nozzle 42, the wick 36, and the wick holder 34. The supply tubes 32 and 44 extend through the baffle 61. The heated air produced in this region is discharged through an exhaust tube 65 which extends through the rear end-wall 66 of the mandrel and may be connected as shown with the intake duct 67 of the pump 46. An excessive suction in the region defined by the baffles 61 and 62 might be detrimental to the casing-forming process, the suction therein may be regulated by a butterfly valve 68 of a manifold 69 which connects the exhaust duct 65 and the intake duct 67 of the pump. The manifold 69 has a flap valve 71 or other means. By adjustment of the valves 68 and 71, at the admission of air from the atmosphere the ratio of recirculated air for replacement air required to maintain the flow to both nozzles 41 and 42 may be determined as desired. The withdrawal of heated air through the mandrel walls and the casing passing therealong at a lower temperature reduces the consumption of heat for the drying system and thusly the demand for heat from the heater 51. Valves 71 and 72 included in the lines to respective air nozzles independently control the passage of heated air to each nozzle.

The baffles 61 and 62, as shown, are readily removable through the end of the mandrel enclosed by the cap 63 when the cap is removed. The cap may be employed to secure the baffles in position. The baffle 61 is positioned with respect to the length of the mandrel by small bosses 74. It may be permanently fixed in the mandrel as by welding. The baffle 62 has a generally oval shape which adapts it to fit along the inner periphery of the cylindrical mandrel in the inclined position shown in Fig. 1. Its upper end rests against an end-surface of the exteriorly threaded portion of the cap in threaded relation with a threaded portion of the interior surface of the mandrel. The baffle 61 is readily removed after the wick holder and the curved end portion of the tube 44 are removed by uncoupling a union 44a.

The sheet 20 and the casing derived as a product thereof are propelled through the apparatus by a take-up and/or packaging means, such as the system shown, comprising a pair of nip rolls 76 and 77 of which the roll 76 is driven by a speed reduction unit 78 driven, in turn, by a motor 79. A power output sprocket 80 of the unit 78 is connected to the roll 76 by a chain 81 which extends around a sprocket mounted on the roll shaft 82. The rolls 76 and 77 are provided preferably with resilient peripheral surfaces provided by cylindrical sleeves 85 and 86 of rubber-like material. The rolls are urged together with merely such pressure as is necessary to advance the casing through the apparatus without slippage with respect to the roll surfaces. Excessive pressure would tend to injure the casing along folded sections. The casing may be packaged as a roll, as shown, which is supported by a spindle 88. The spindle supports a slip clutch 89 of which the drive-receiving member is fixedly connected with a coaxial pulley 90. The pulley 90 is connected by a belt 91 of a pulley 92 fixed on the shaft 82 of the roll 76. By thus connecting the spindle 88 in non-positive drive relation with the roll 76, the casing may be collected on the spindle 88 as a product package with sufficient tension in the casing to maintain it free from slack. Conventional slip clutches are readily adjustable to provide any magnitude of tension desired.

The outstanding advantage of the present invention is that casings fabricated from a sheet material comprising an alkali-soluble material may now be produced conventionally and inexpensively in a condition adapting then for immediate packaging after the fabrication procedure and further adapting them for storage periods of indefinite length. This has been accomplished by eliminating any alkali, acid, or moisture that might be incorporated into the joint of the casing as might occur in practicing the processes of the prior art. Specifically, the desirable condition of the casing is obtained by replacing any alkaline material with a chemically neutral material which is not injurious to the material comprising the sheet and may actually have beneficial secondary results such as rendering the joint pliable and plasticizing it to an extent that protects it against eventual embrittlement. The neutralizing material may be so selected that the presence of an excess thereof, or a product of reaction of such material with the alkali may actually favor preservation of food packaged in the casing prepared in accordance with this invention. Another advantage of the invention results from the simplicity of the process and the facility thereof with which a moisture-free product may be obtained. Moisture is difficult to eliminate from the interior of the casing by other known processes without considerable expense.

While a preferred embodiment of the invention has been shown and described, it is to be understood that changes and variations may be made without departing from the spirit and scope of the invention as defined in the appended claims.

I claim:

1. In a process for the production of tubular casings by the steps of guiding a continuous running length of an alkali-soluble, water-insoluble sheet material longitudinally to a forming position, continuously shaping the sheet into a tubular form with the edges overlapped, applying an alkaline solution to at least one of the overlapping edges to make it adhesive before bringing the edges together, and then pressing the overlapping edges together as a sealed joint to form a tubular casing, the improvement comprising neutralizing the excess alkaline medium in the joint by applying thereto an aqueous substantially neutral solution of a salt which reacts with the alkaline medium to form a neutral product and a volatilizable product, and then drying, said neutralizing solution being chemically inert with respect to the casing material.

2. Process of claim 1 wherein the neutralizing solution is an ammonium salt of an organic acid.

3. Process of claim 1 wherein the sheet material is hydroxyethyl cellulose.

4. Process of claim 1 wherein the sheet material is a cellulose ether.

References Cited in the file of this patent

UNITED STATES PATENTS

| | | |
|---|---|---|
| 1,651,751 | Cadwell | Dec. 6, 1927 |
| 2,607,696 | Kunz | Aug. 19, 1952 |
| 2,638,147 | Nebel | May 12, 1953 |
| 2,665,737 | Hasselquist | Jan. 12, 1954 |
| 2,686,128 | Conti | Aug. 10, 1954 |